United States Patent

Feer et al.

[11] Patent Number: 5,312,054
[45] Date of Patent: May 17, 1994

[54] FOOD GRATER

[75] Inventors: David L. Feer, Medina; Rex R. Mast, Orrville, both of Ohio

[73] Assignee: Rubbermaid Incorporated, Wooster, Ohio

[21] Appl. No.: 367

[22] Filed: Jan. 4, 1993

[51] Int. Cl.⁵ ............................................... A47J 43/25
[52] U.S. Cl. ...................................... 241/95; 241/273.2
[58] Field of Search .................... 241/168, 95, 273.1, 241/273.2, 83, 92, 280, 285.1, 285.2, 285.3

[56] References Cited

U.S. PATENT DOCUMENTS

| | | | |
|---|---|---|---|
| D. 230,241 | 2/1974 | Riddington | 241/95 X |
| 555,834 | 3/1896 | Taylor | 241/273.1 X |
| 1,332,260 | 3/1920 | Jones | 241/95 |
| 1,410,008 | 3/1922 | Gale et al. | 241/95 |
| 1,497,192 | 6/1924 | Morris | 241/273.1 |
| 1,845,522 | 2/1932 | Rowley | 241/168 |
| 1,915,869 | 6/1933 | Rowley | 241/95 |
| 1,984,216 | 12/1934 | Howlett | 241/273.1 |
| 2,482,180 | 9/1949 | Heard | 241/168 X |
| 2,505,114 | 4/1950 | Hayman et al. | 241/273.2 X |
| 2,786,503 | 3/1957 | Lewis | 241/168 X |
| 3,121,450 | 2/1964 | Cronheim | 241/273.1 X |
| 3,389,447 | 6/1968 | Theobald et al. | 241/273.1 X |
| 3,583,455 | 10/1971 | Ostronsky | 241/95 |
| 4,546,928 | 10/1985 | Suzuki | 241/95 |
| 4,790,488 | 12/1988 | Bowner | 241/95 |
| 4,805,843 | 2/1989 | Draper | 241/95 X |
| 4,928,893 | 5/1990 | Purdle | 241/95 |

FOREIGN PATENT DOCUMENTS

| | | | |
|---|---|---|---|
| 5751 | 6/1901 | Austria | 241/95 |
| 0101417 | 2/1984 | European Pat. Off. | 241/95 |

Primary Examiner—Mark Rosenbaum
Assistant Examiner—Frances Han
Attorney, Agent, or Firm—Richard B. O'Planick; Lisa B. Riedesel

[57] ABSTRACT

A food grater is disclosed comprising an inverted V-shaped freestanding frame defined by first and second panel members (4,6) pivotally joined at upper ends. The panels fold into a parallel orientation for storage and expand into a freestanding orientation for use. Outwardly directed food grating means (22) in at least one of the panels is provided to grate food passed thereover, and apertures (20) communicate with the grating means (22) to pass grated food segments to an inside surface of the panel. A transparent collection container (44) attaches to the inside surface of the panel and serves to collect the fragmented food and display its quantity to the user. The grating means (22) comprises cutting elements having a U-shaped cutting edge, comprising spaced apart first and second parallel and linear leading edges (28), and a trailing cut-off edge (32) at a rearward end for cutting off the food fragment.

26 Claims, 12 Drawing Sheets

FOOD GRATER

BACKGROUND OF THE INVENTION

1. Field of the Invention

The present invention relates generally to food graters for grating and shredding food fragments from a large, solid food block, and specifically to graters of the type which provide cutting blades over which a user manually moves a food block.

2. The Prior Art

Graters and shredders are well-known kitchen utensils. They are used for fragmenting food, such as cheese, vegetables, etc. for a variety of prepared dishes.

Commonly available graters typically are four-sided metal forms, which create a box open at the top and bottom. The grater has an array of cutting blades stamped to project outwardly differing degrees from each of the four sides, in order to grate food into fragments of varying size. The grater is formed from a blank sheet, with the blades stamped from the same stock as the body of the grater. In order to make the blades sharp enough to cut food, approximately 0.005 to 0.025 inches, the blank sheet must be of the same thickness. Consequently, after the blades are stamped outward and the sheet is reformed into a rectangular or square body, the body will have the same stock thickness as the blades. The result is a thin, rather insubstantial body which can easily become deformed from use.

A secondary consequence is that the blade edges can have burrs from the stamping process, creating a hazard to the user who must manually pressure the food block across the blades.

While commercially available graters and shredders work relatively well, certain deficiencies attend their use. First, as explained above, the grater body is thin-walled metal, making the device susceptible to deformation, also prone to rust after repeated washings. Secondly, the metal stamped teeth may have burrs which can cut a user during use. In addition, the stamp and form manufacturing process used to form the devices is relatively slow and expensive. Additionally, the body of conventional graters lacks a convenient means for collecting and measuring the amount of grated food. Food fragments are confined loosely on the work surface within the sidewalls of the grater, and the amount of food must be estimated by eye. Finally, box-shaped existing graters are bulky to store and provide less than satisfactory rigidity when grating pressure is applied to the grating surface.

SUMMARY OF THE INVENTION

The present invention overcomes the aforementioned shortcomings in available graters by providing a grater comprising solely plastic parts which are economical to produce and readily assembled. The body of the grater is of A-frame configuration, free standing when in use, and folding at the top coupling for compact storage. The body comprises first and second panel members pivotally joined at upper ends, with the panels having outwardly directed food grating blades located thereon in an arrayed pattern. The panels further comprise apertures extending therethrough for passing grated food fragments from the outside surface to an inside surface thereof.

A container is provided for selective assembly to either of the panel member inside surfaces at the election of the user, and functions to collect the fragmented food. The container is at least partially transparent so as to visually indicate the amount of food therein to the user, and includes measurement indicator lines for communicating food quantity to the user. The container is readily detached from the panel members and withdrawn from the sides of the A-frame body.

Each of the cutting blades on one of the panel members is configured to have a U-shaped cutting edge comprising spaced apart first and second leading edges at a forward end for initial penetration into a block of food, and for defining a food fragment therebetween, and the cutting edge further comprising a trailing cutoff edge at a rearward end for cutting off the food fragment. The cutting edge bends substantially ninety degrees and rises in elevation from a horizontal orientation at the forward leading edge portions to a vertical orientation at the rearward cutoff edge.

The cutting edge is molded of plastics material having a relatively thinner thickness than the panel members, which thickness being optimally selected to provide a sharp enough edge for slicing food, yet not so sharp so as to create an unacceptably high cutting risk to the user. Moreover, because the panel members and other portions of the frame body are molded of thicker dimension than the cutting elements, the body is sturdy and rigid and can withstand the grating pressure. Lastly, the all plastic construction is economical and creates a device which does not rust after repeated washings.

Accordingly, it is an objective of the present invention to provide a grater which is structurally stable and which provides sharp cutting blades for the grating of food. Further objectives of the present invention are to provide a grater:

which collapses into a compact configuration for convenient storage;

which is freestanding in use and which provides a solid resistance to grating pressure;

which has means for collecting and measuring the amount of grated food fragments;

which has multiple grating blades for alternatively sized grating of food;

which has means for informing a user of the preferred direction in which food should pass over the grating blade array;

which has an improved blade configuration for cutting food; and which is economical to produce and manufacture.

These, and other objectives, which will be apparent to those skilled in the art, are achieved by a preferred embodiment which is described in detail below and which is illustrated by the accompanying drawings.

DESCRIPTION OF THE PREFERRED EMBODIMENT

Figure 1:
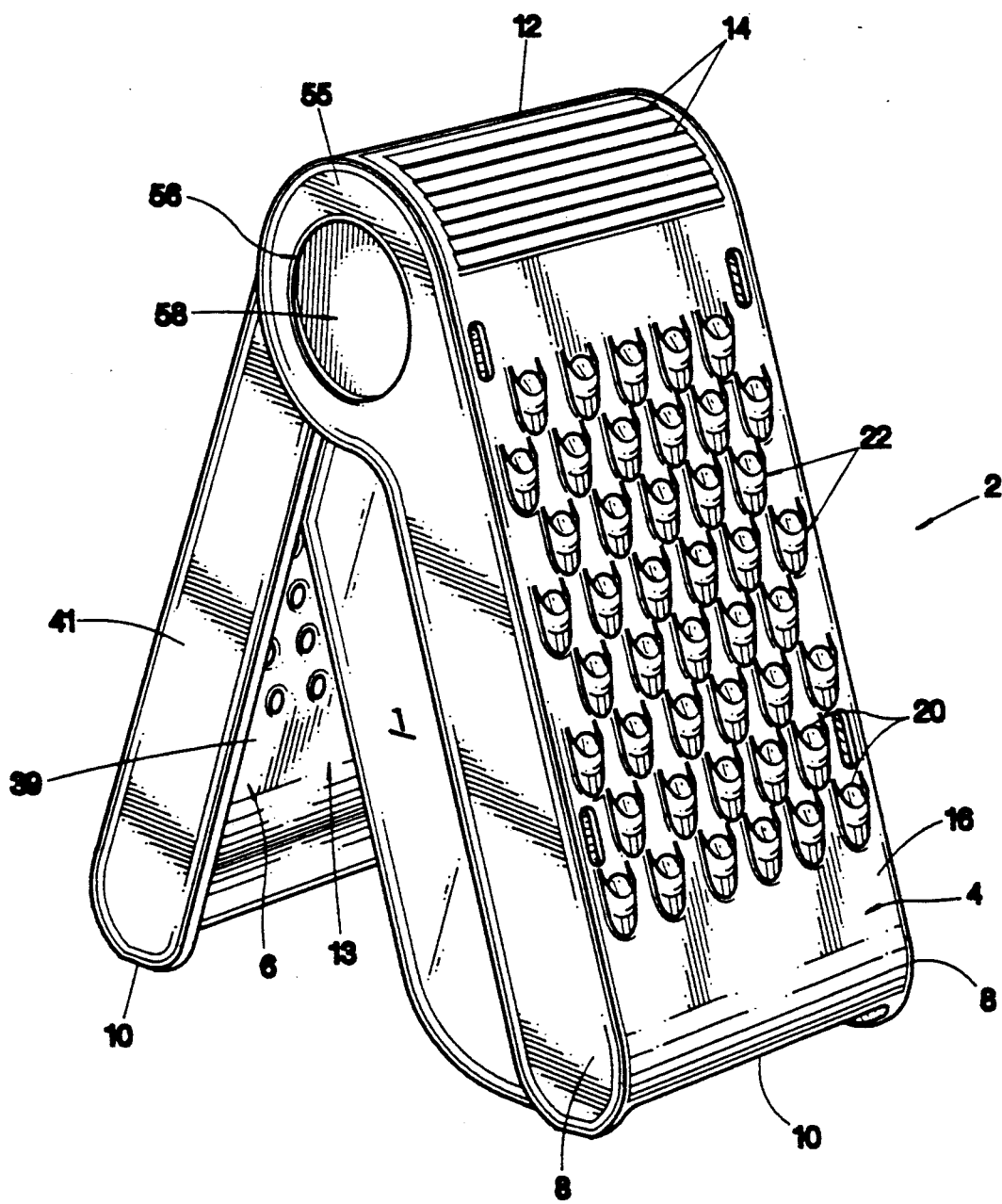
FIG. 1 is a perspective view of the subject grater in the expand configuration for the grating of food.
Figure 2:
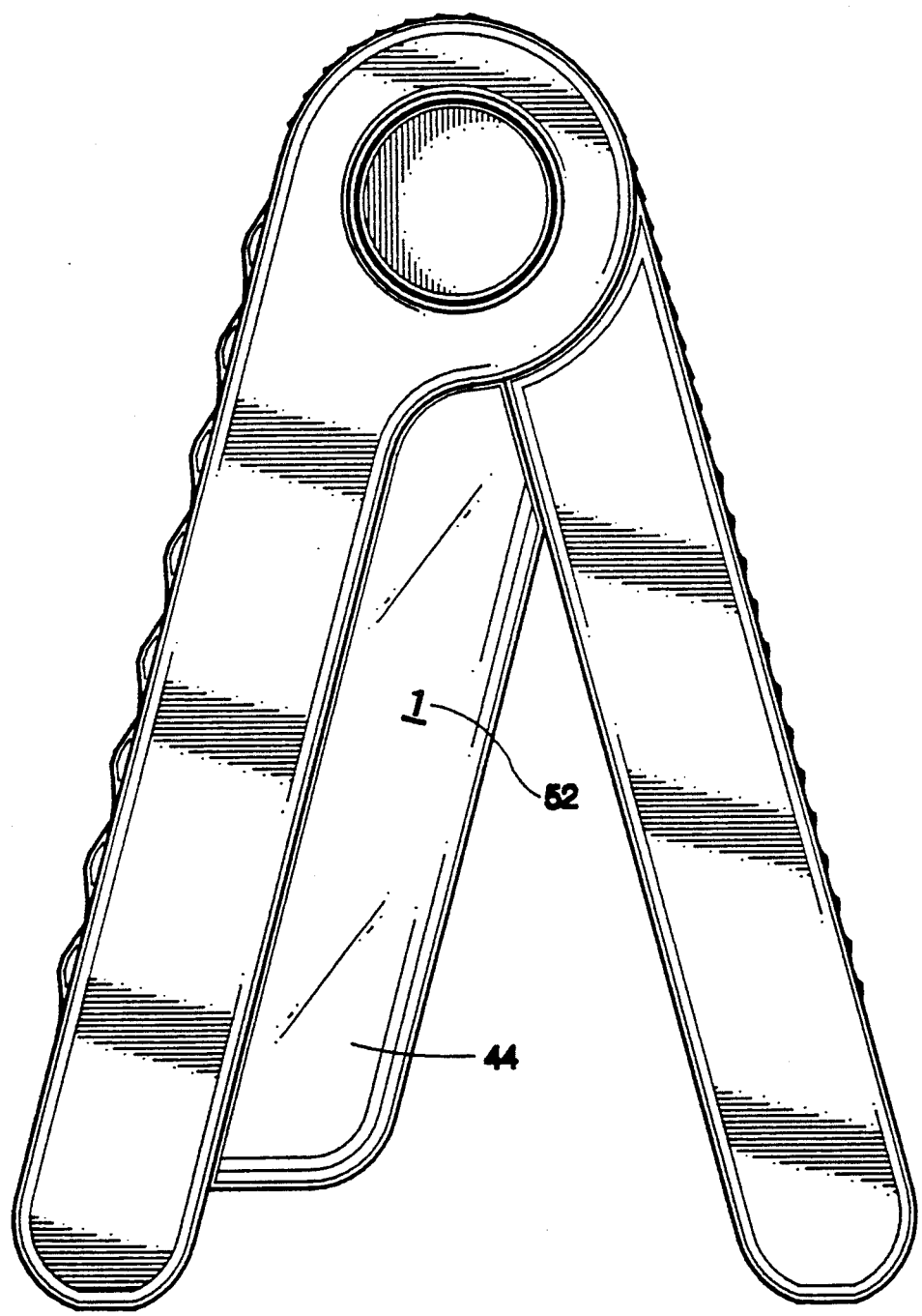
FIG. 2 is a side elevation view thereof.
Figure 9:
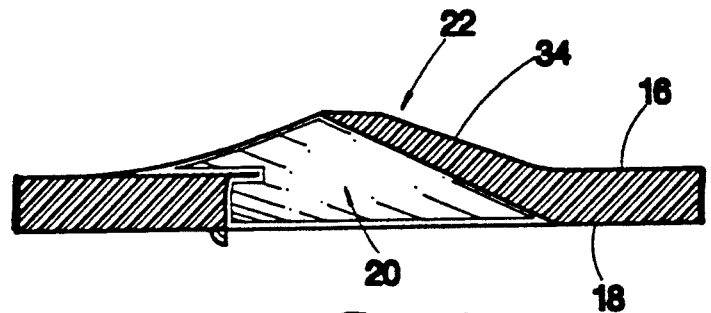
FIG. 9 is a a section view through the cutting blade of the grater, taken along the line 9—9 of FIG. 4.
Figure 10:
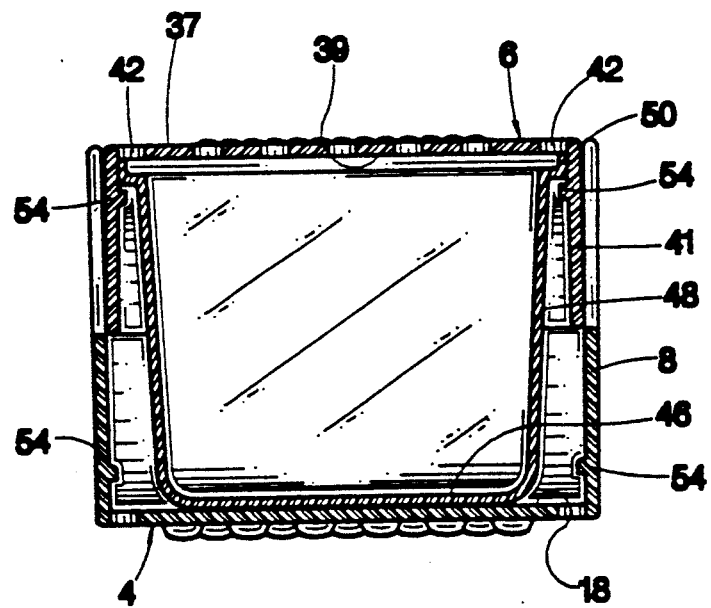
FIG. 10 is a section view through the collapsed grater taken along the line 10—10 of FIG. 5.

Referring first to FIGS. 1, 9, and 10, the subject grater/shredder 2 is shown to comprise two panel members 4, 6, each having sidewalls 8, 41 extending from a lower end 10 to an upper end 12 and defining with the panel members 4, 6 an internal chamber 13. The panel members are molded conventionally of plastic material such as styrene.

Figure 11:
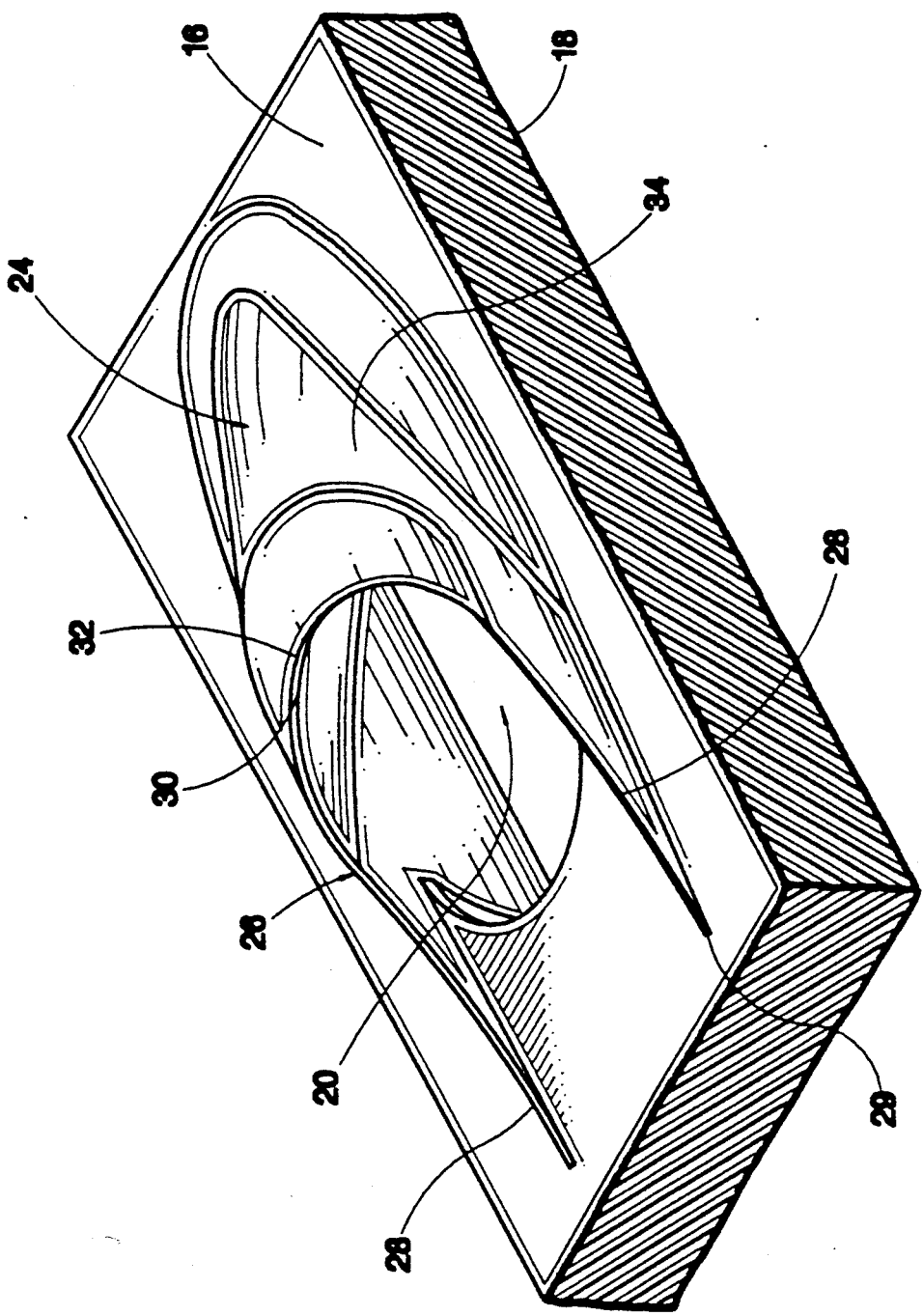
FIG. 11 is an enlarged perspective view of the cutting blade element of the grater.

It will be appreciated that the panel members diverge from the upper end 12 to create an A-frame which is freestanding. The panel member 4 has saw-toothed gripping ridges 14 over a radiused upper end portion, and provides an outward facing surface 16 and an internal inward surface 18. An array of apertures 20 of generally circular shape extend through the panel member from the outward surface 16 to the inward surface 18. Each aperture 20 has associated therewith a cutting element 22 which is illustrated in detail by FIGS. 9 and 11.

As shown, the cutting elements 22 each comprise a shoe shaped body 24 having a generally U-shaped cutting edge 26 directed toward the upper end 12 of the grater. The cutting edge 26 comprises spaced apart leading edges 28 at a forward end 29, which rise in elevation from the outward surface 16 to a rearward cutting edge end 32, where a cut-off edge 30 is located. An outward hooded shell 24 extends from the rearward cutting edge end 32 down to the panel surface 16 and encircles the aperture 20.

The cutting edge 26 is molded to present a horizontal cutting surface at the leading edges 28, and thereafter bends gradually ninety degrees toward the rearward end 32, finally terminating at the cut-off edge 30 which is vertical in orientation. The cutting edge 26 is molded to have a width of between 0.005 and 0.010 inches, for optimal cutting sharpness. In contrast, the panel members 4 and 6 are molded having a wall stock of 0.090 inches for structural rigidity and to create a frame strong enough to resist grating pressure applied to the panel surface 16.

It will be appreciated that, in use, a food block such as cheese is pressured against the panel surface 16 and moved in a downward direction. The leading edges 28, facing upward and being flat, facilitate a clean initial cut into the food block and define therebetween a food fragment.

As the food fragment proceeds toward the rearward end 32 of the cutting edge, the cutting edge 26 deepens its cut into the food block until the fragment reaches the cut-off edge 30. When the food fragment reaches the vertically oriented cut-off edge 30, it is severed from the block by a clean cut.

The gradual transition of the cutting edge 26 from a flat horizontal orientation to the vertical cut-off edge 30 deters the cutting edge from dulling through use, and maintains the edge at an optimum sharpness. Also, it gradually deepens the cut into the food fragment until cut-off occurs.

The food fragments, once severed from the block, fall through the apertures 20 to the inside surface of the panel member.

Referring to FIGS. 1, 5, 8, and 10, the second panel member 6 is shown to comprise a series of gripping ribs 36 across an upper radiused portion of an outward surface 37, through which an array of apertures 38 extend to an inward surface 39. The panel wall stock thickness is preferably 0.090 inches. A bead projection 40 is associated with each of the apertures 38, positioned to engage a food block as it passes from the top end 12 to the bottom end 10 of the panel member 6 against surface 37. Each bead projection 40 is generally hemispherical in shape.

Figure 5:
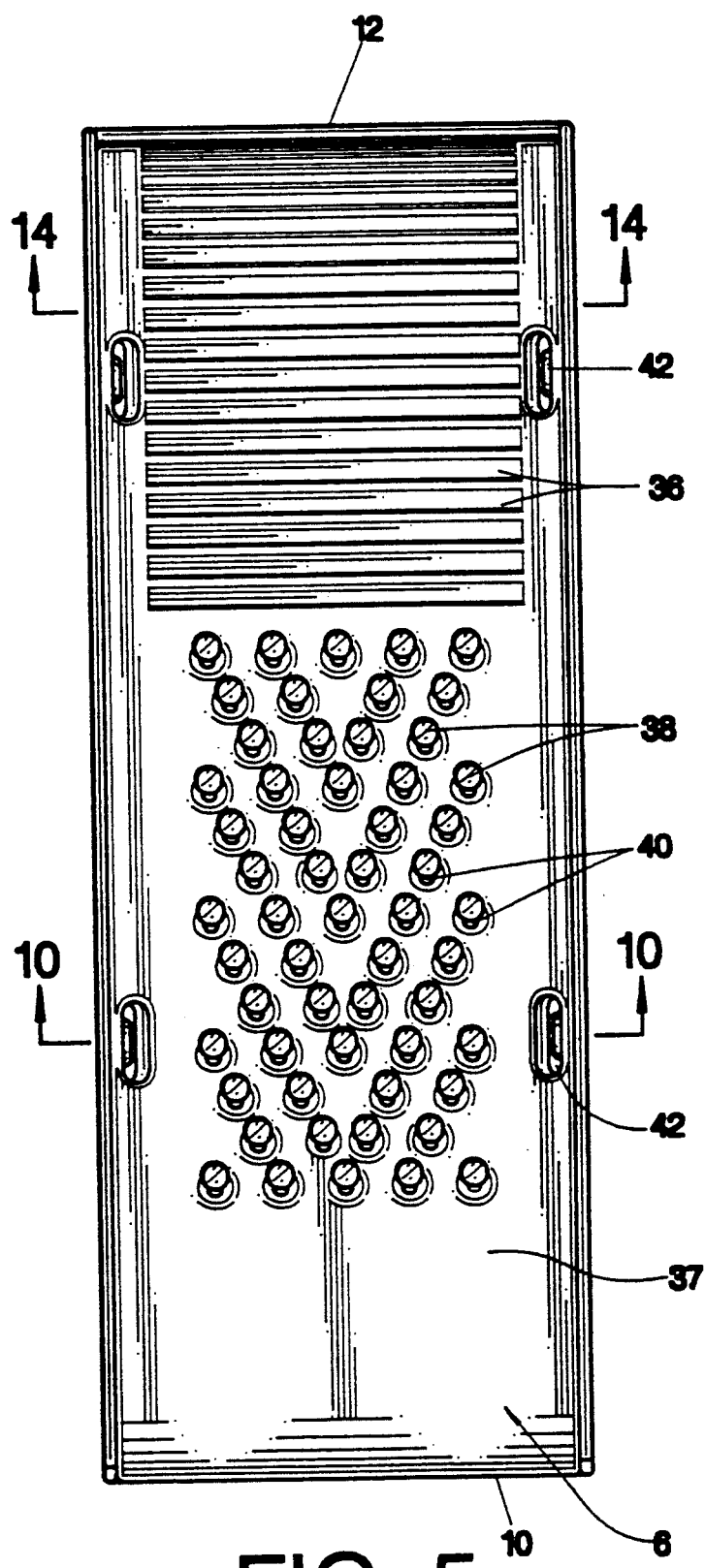
FIG. 5 is a bottom plan view of the grater.
Figure 8:
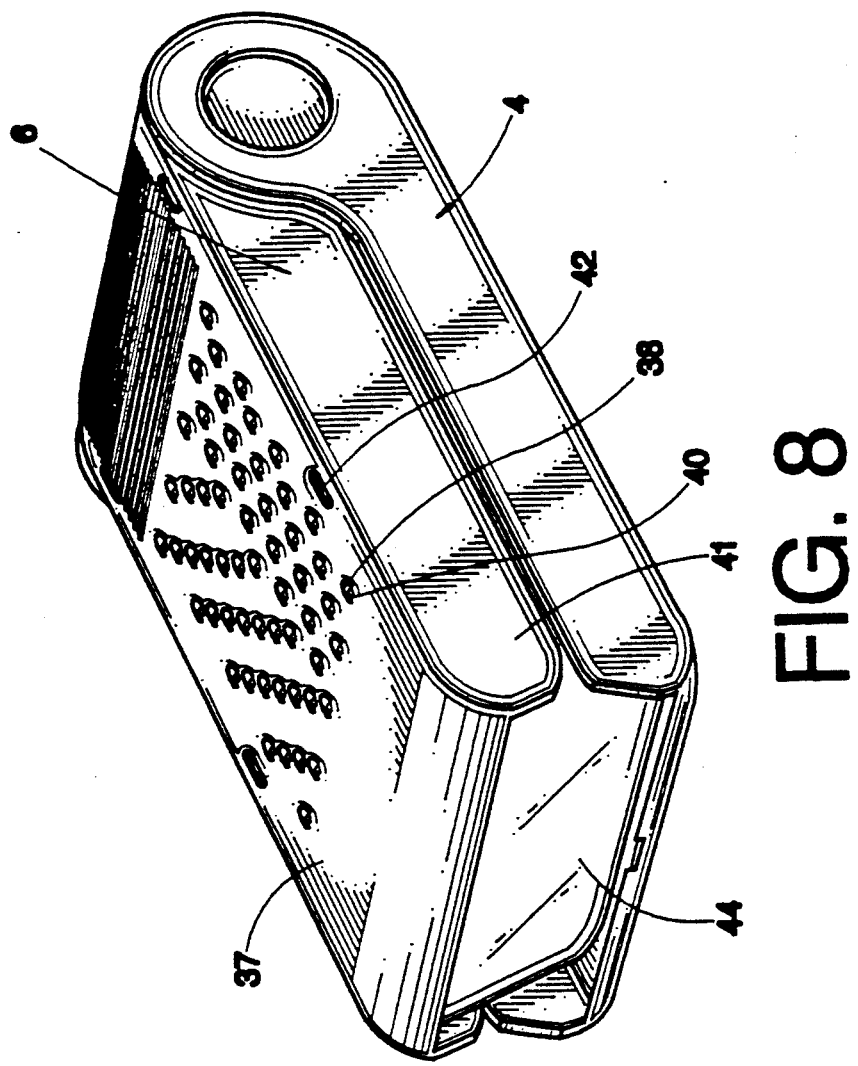
FIG. 8 is a bottom perspective view of the collapsed grater.

It will be noted that the bead projections 40 are arranged in offset rows and columns shown best by FIGS. 5 and 8. The resulting array comprises a series of arrows which collectively point from the top to the bottom of the panel, the intended direction that a food block is to be moved relative to the grater. Thus, the arrangement of beads 40 serves to communicate to the end user the operational direction to be followed.

The panel member 6 has perpendicular sidewalls 41, which define with the inward surface 39 an internal chamber 13. There are four rectangular openings 42 through the panel member which facilitate (FIGS. 5 and 10) the molding of four retention ledges 54 on the inside surface of the sidewalls 41, two on each sidewall. The opposite panel member 4 likewise has four openings 42 in the outward surface which communicate with four retention ledges 54 molded to the sidewalls 8. The purpose of the retention ledges will be explained below.

Figure 12:
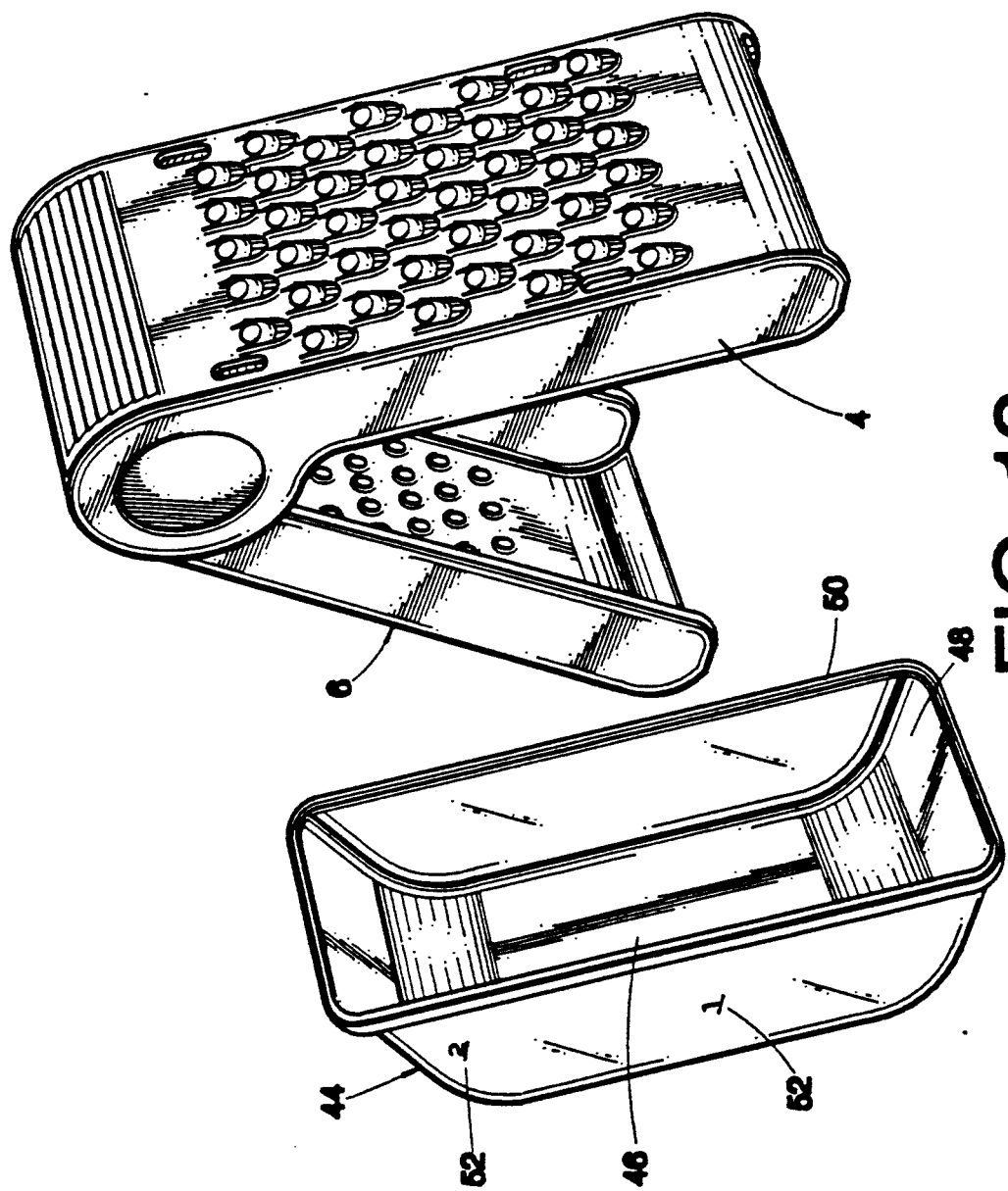
FIG. 12 is a perspective view of the grater in the expanded configuration with the container intended to be used in association therewith.

Referring to FIGS. 1, 10, and 12, a container 44 of rectangular proportion is shown comprising a bottom 46 and sidewalls 48 terminating at an upper rim flange 50. The container is molded of common plastics material such as polycarbonate, and is transparent. The longitudinal sidewalls of the container are calibrated by volume measurements, such as cups, indicated as 52. The container is designed for collecting food fragments created by either panel member 4, 6, as follows.

The container is dimensioned for positionment against the inside surface of either panel member, as the rim flange 50 is captured between the inside surface of the wall panel and the four retention ledges 54 molded to the surface. Attachment is effected by flexing the sides of the container inward until they clear the ledges 54, and thereafter releasing the sides to reassume their normal shape. So positioned, the vertically oriented container is attached to the sidewall and situated to receive the food fragments passing through the panel member. The volume markings 52 are exposed to the user of the grater/shredder who can thereby ascertain the total volume of grated material. It will be noted that the lower end wall of the container 44, in the vertical orientation, is below the bottommost aperture of the panel member to which it is attached. Fragmented food can therefore easily clear the panel apertures and fall into the container. Also, the container is removable from between the panel members by withdrawal from the sides of the A-frame, without any loss of grated material.

Figure 13:
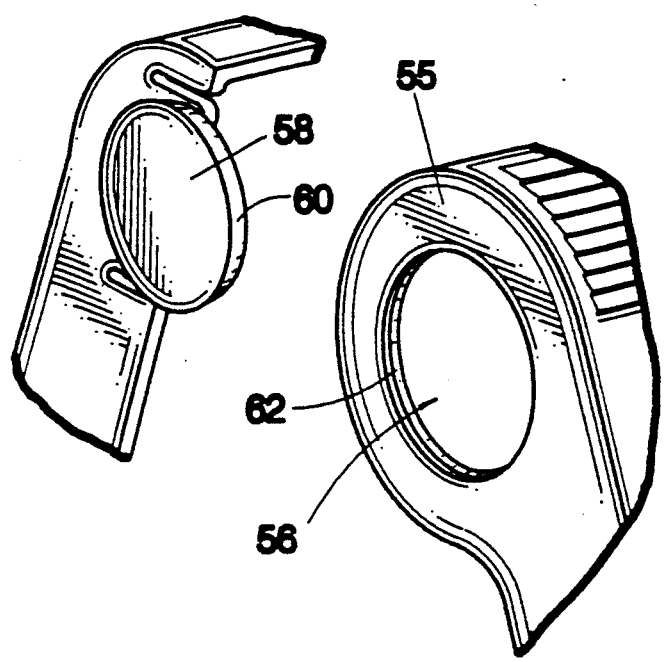
FIG. 13 is a fragmentary perspective view of the top end of the panels comprising the grater, showing the pivoting attachment structure.
Figure 15:
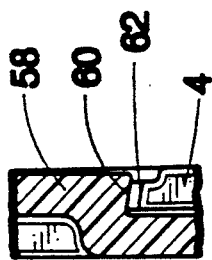
FIG. 15 is a section view through the pivot connection of the two panels of the grater, taken along the line 15—15 of FIG. 1.
Figure 14:
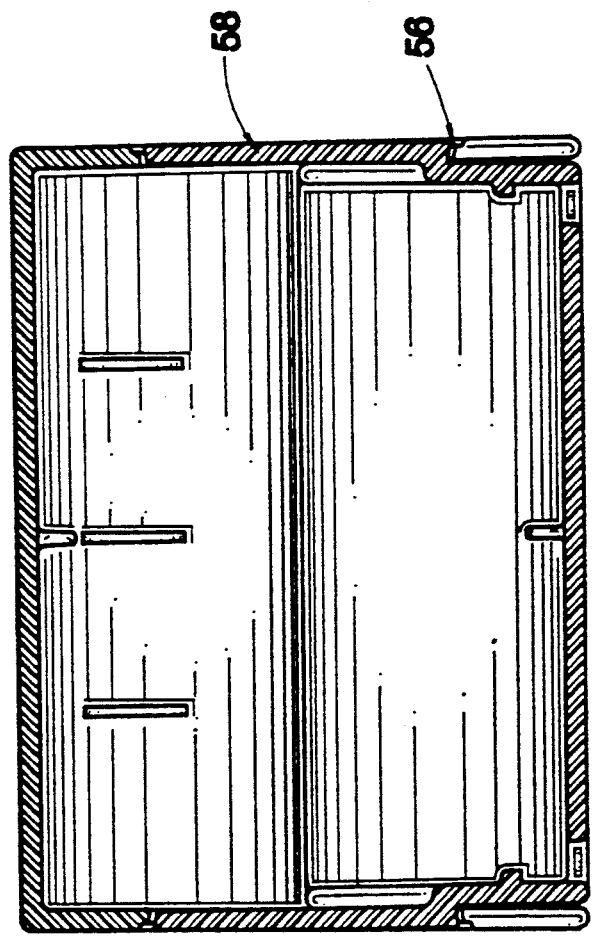
FIG. 14 is a section view through the collapsed grater taken along the line 14—14 of FIG. 5.

Referring to FIGS. 1, 13, 14, and 15, the pivot attachment of panel members 4, 6, is illustrated. The sidewalls 8 of panel member 4 has a rounded, radiused upper lobe portion 55 through which two circular sockets 56 extend. The sockets are sized to admit a circular button 58 molded to the upper sidewalls 41 of panel member 6. The button has beveled sides 60, as best shown by FIGS. 13 and 14 and the socket sidewalls 62 are complementarily beveled in the direction shown. Consequently, when assembled and in the expanded configuration of FIG. 1, the socket sidewalls and button sidewalls engage in a direction which tends to keep buttons 48 within their respective sockets 56, and not escape. Thus, even when grating pressure is applied to outward surfaces of panel members 4, 6 in the downward direction, there will be no failure at the pivot connection.

Figure 3:
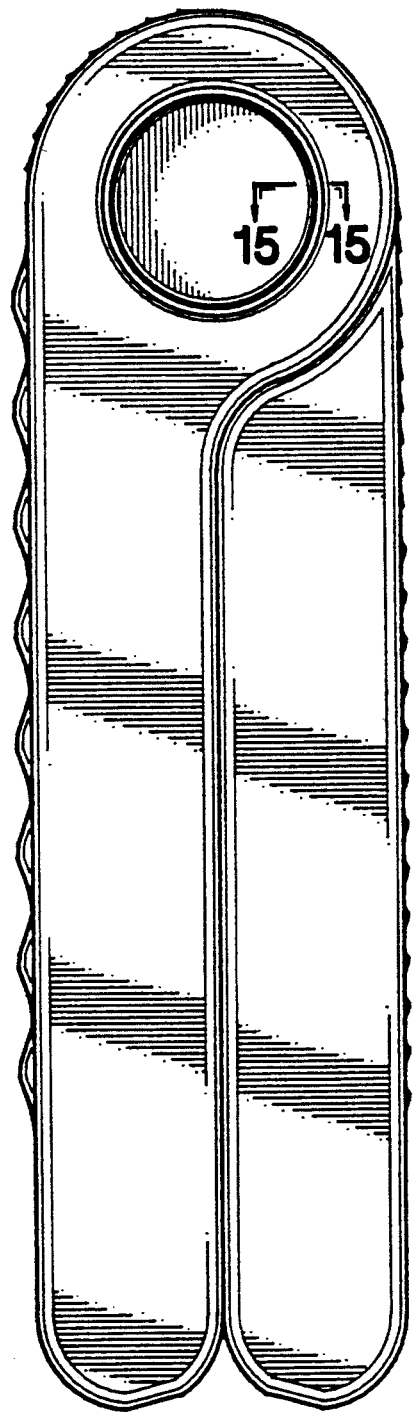
FIG. 3 is a side elevation view of the grater shown in the collapsed storage configuration.
Figure 4:
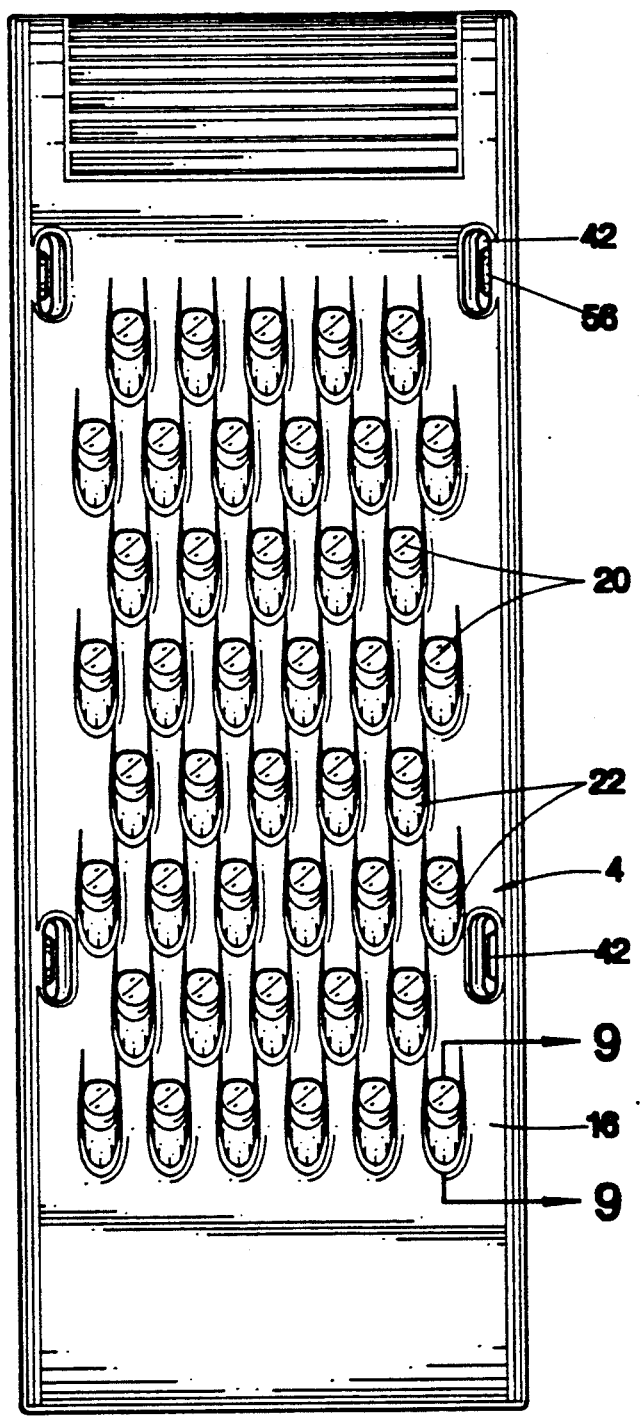
FIG. 4 is a top plan view of the grater.

As will be appreciated, the panel members 4, 6 diverge into the configuration shown in FIG. 1 when in use and collapse into the flat position of FIG. 3 for storage.

The cutting cells in panel 4 are intended to shred foodstuff such as vegetables and cheese, while the cutting cells in panel 6 are designed for grating foodstuff such as lemon rind, nutmeg, hard cheese, etc. It will be appreciated that the A-frame of the grater provides a slanted work surface for easier use by a user. Moreover, the rounded, radiused top end 12 with finger ribs provides a safe, slip-resistant grip. Also, the A-frame stands flat on a countertop in use for greater stability and support.

From the above it will further be noted that the panel 4 cutting cells are of plastic construction, having a thickness substantially less than the wall stock of the panel members. Thus, a sharp cutting edge is provided where needed, yet the body of the grater is solid and substantial.

The plastic blades are easy to clean, will not rust, and do not have unsafe burrs. Moreover, they are strong, sharp, and sequentially sever food fragments for a superior and easier cutting action.

Figure 6:
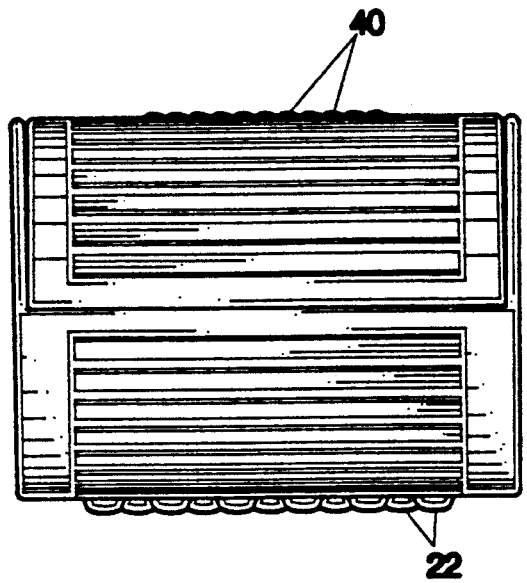
FIG. 6 is a top plan view of the collapsed grater.
Figure 7:
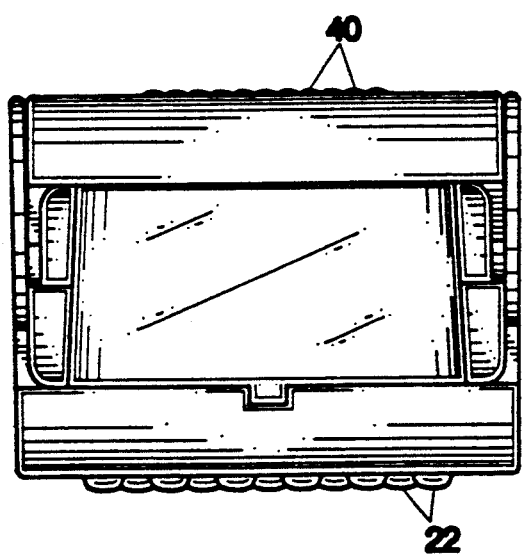
FIG. 7 is a bottom plan view of the collapsed grater.

Referring to FIGS. 6 and 7, it will be seen that the configured arrays off offset cutting elements on panels 4, 6 is such that, as a food stock is passed across either panel outward surface, all point on the food block over the array of cutting elements are contacted by the cutting elements. That is, no point on the food block can escape fragmentation by the cutting elements.

Lastly, as shown in FIGS. 3 and 8, the grater folds flat for space conserving storage. While the above sets forth the preferred embodiment, the subject invention is not to be so confined. Other embodiments which will be obvious to one skilled in the art and which utilize the teachings herein set forth are intended to be within the scope and spirit of the subject invention.

We claim:

1. A food grater comprising:
   an inverted V-shaped freestanding frame having vertically oriented first and second panel members pivotally joined at upper ends and having divergent lower ends for supporting the frame on a work surface, the frame panel members folding into a mutually parallel orientation for storage and expanding into a freestanding orientation for use;
   at least one of the panel members having outwardly directed food grating blade means located on an outward surface of the one panel member to intercept and grate food passing downwardly over the outward surface;
   the one panel member having aperture means therethrough from an inside surface to said outward surface, oriented with the blade means to pass grated food fragments from the outward surface to the inside surface; and
   the device further comprising a food collection container having an open mouth portion positioned against the inside surface of the one panel member to receive and collect the food fragments.

2. A grater according to claim 1, the container having means for attaching to the one panel member inside surface.

3. A grater according to claim 2, wherein the container is removable from between the frame panel members.

4. A grater according to claim 3, wherein the container has at least one transparent side visible to a user and further comprises measuring gradations along an outward side which are visible to a user of the grater and which inform the user of the amount of grated food fragments in the container.

5. A grater according to claim 3, wherein the opposite second panel has outwardly facing food grating blade means on an outward surface, and aperture means extending from the outward surface to an inward surface, and the food container is alternatively positionable against and attachable to the inside surface of the second panel member for receiving and collecting food fragments passing through the aperture means.

6. A food grater comprising:
   an inverted V-shaped freestanding frame having vertically oriented first and second panel members pivotally joined at upper ends and having divergent lower ends for supporting the frame on a work surface, the frame panel members folding into a mutually parallel orientation for storage and expanding into a freestanding orientation for use; at least one of the panel members having outwardly directed food grating blade means located on an outward surface of the one panel member to intercept and grate food passing downwardly over the outward surface;
   the panel members each having opposite sidewalls extending from the upper end toward the lower end, one of the panel members having socket apertures extending through the sidewalls at the upper end and the opposite second panel member having boss members protruding therefrom at said first end for residence within the socket apertures; and
   the boss members and socket apertures are defined by complimentarily beveled sidewalls, and opposing boss members and socket aperture sidewalls inhibiting removal of the boss members from their respective socket aperture.

7. A food grater comprising:
   an inverted V-shaped freestanding frame having vertically oriented first and second panel members pivotally joined at upper ends and having divergent lower ends for supporting the frame on a work surface, the frame panel members folding into a mutually parallel orientation for storage and expanding into a freestanding orientation for use; at least one of the panel members having outwardly directed food grating blade means located on an outward surface of the one panel member to intercept and grate food passing downwardly over the outward surface;

the food grating blade means comprising a plurality of rows of cutting projections forming a cutting projection array having a width and a length dimension, and the cutting projections extending outward from the outward surface of said one panel, and wherein the rows of cutting projections are spaced such that a surface of food having a width less than or equal the cutting projection array width and passing thereacross is encountered at all points by at least one cutting blade projection; and the cutting projection array forms a series of arrows which point in an intended direction in which food is to be passed.

8. A food grater comprising:

a freestanding frame having spaced apart and vertically freestanding first and second panel members defining therebetween a chamber;

at least one of the panel members having outwardly directed food grating blade means located on an outward surface of the one panel member to intercept and grate food passing across the outward surface, and aperture means therethrough from an inside surface to the outward surface, oriented to the blade means to pass grated food fragments from the outward surface to the inside surface;

a food collection container positionable between the first and second panel members in said chamber and having a bottom and sides and an open top positionable against the inside surface of the one panel member to receive and collect the food fragments; and releasable attachment means for securing the container against the one panel member inside surface and selectively releasing the container therefrom for removal from said chamber.

9. A grater according to claim 8, wherein at least one of the container sides is transparent and visible to the user, whereby the volume of grated food in the container can be visibly ascertained.

10. A grater according to claim 9, wherein said container having measuring gradations along at least one side visible to inform a user of the volume of grated food fragments in the grater.

11. A grater according to claim 8, wherein the opposite second panel has outwardly facing food grating blade means on an outward surface and aperture means extending from the outward surface to an inward surface, and the food container is alternatively positionable against and attaches to the inside surface of the second panel member for receiving and collecting food fragments passing through the aperture means.

12. A grater according to claim 11, wherein the food container having means for alternatively attaching to the inside surface of either panel member with the food container open top facing in opposite directions at the election of the user.

13. A grater according to claim 8, wherein the blade means comprising an array of individual cutting elements, each said cutting element comprising a body elevated from said outward surface of the one panel member and having a substantially U-shaped cutting edge, the cutting edge comprising spaced apart first and second parallel and linearly extending leading edges at a forward end for initial penetration into a food block passing thereover, and for defining a food fragment therebetween, and the cutting edge further comprising a trailing cutoff edge at a rearward end for cutting off said food fragment as the food block passes thereover.

14. A grater according to claim 13, wherein the leading edges are substantially parallel to an intended direction of travel of the food block thereover and the cutoff edge is substantially perpendicular to the intended direction of travel of the food block.

15. A grater according to claim 14, wherein the leading edges rise in elevation from the outward surface of the one panel member from the forward end to the rearward end of the cutting edge.

16. A grater according to claim 15, wherein the cutting edge is horizontal at the leading edge and vertical at the cutoff edge.

17. A grater according to claim 16, wherein the cutting elements are formed of plastic material.

18. A grater according to claim 27, wherein the cutting edge has a width within a range of widths between 0.001 and 0.100 of an inch.

19. A food grater comprising a panel member having outwardly directed food grating blade means located on an outward surface of the panel member to intercept and grate a food block passing across the outward surface, and aperture means therethrough from an inside surface to the outward surface, positioned to receive grated food fragments and pass the fragments from the outward surface to the inside surface; the blade means comprising at least one individual cutting element, said cutting element comprising a body elevated from said outward surface of the panel member and having a substantially U-shaped cutting edge, the cutting edge comprising spaced apart, parallel and linearly extending first and second leading edges at a forward end for initial penetration into a food block passing thereover, and for defining a food fragment therebetween, and the cutting edge further comprising a trailing cutoff edge at a rearward end for cutting off said food fragment as the food block passes thereover.

20. A grater according to claim 19, wherein the leading edges are substantially parallel to an intended direction of travel of the food block thereover and the cutoff edge is substantially perpendicular to the intended direction of travel of the food block.

21. A grater according to claim 20, wherein the leading edges rise in elevation from the outward surface of the panel member from the forward end to the rearward end of the cutting edge.

22. A grater according to claim 21, wherein the cutting edge bends substantially ninety degrees from a horizontal orientation at the forward leading edges to a vertical orientation at the rearward cutoff edge.

23. A grater according to claim 22, wherein the cutting elements and the panel member are unitarily formed of plastics material.

24. A grater according to claim 23, wherein the cutting element cutting edge is of relatively thinner stock than the panel member.

25. A grater according to claim 24, wherein the cutting edge has a width within a range of widths between 0.001 and 0.100 of an inch.

26. A grater according to claim 25, wherein the cutting element body having a curved external surface extending from the cutting edge to the outward surface of the panel member.

* * * * *